United States Patent Office 3,233,921
Patented Feb. 8, 1966

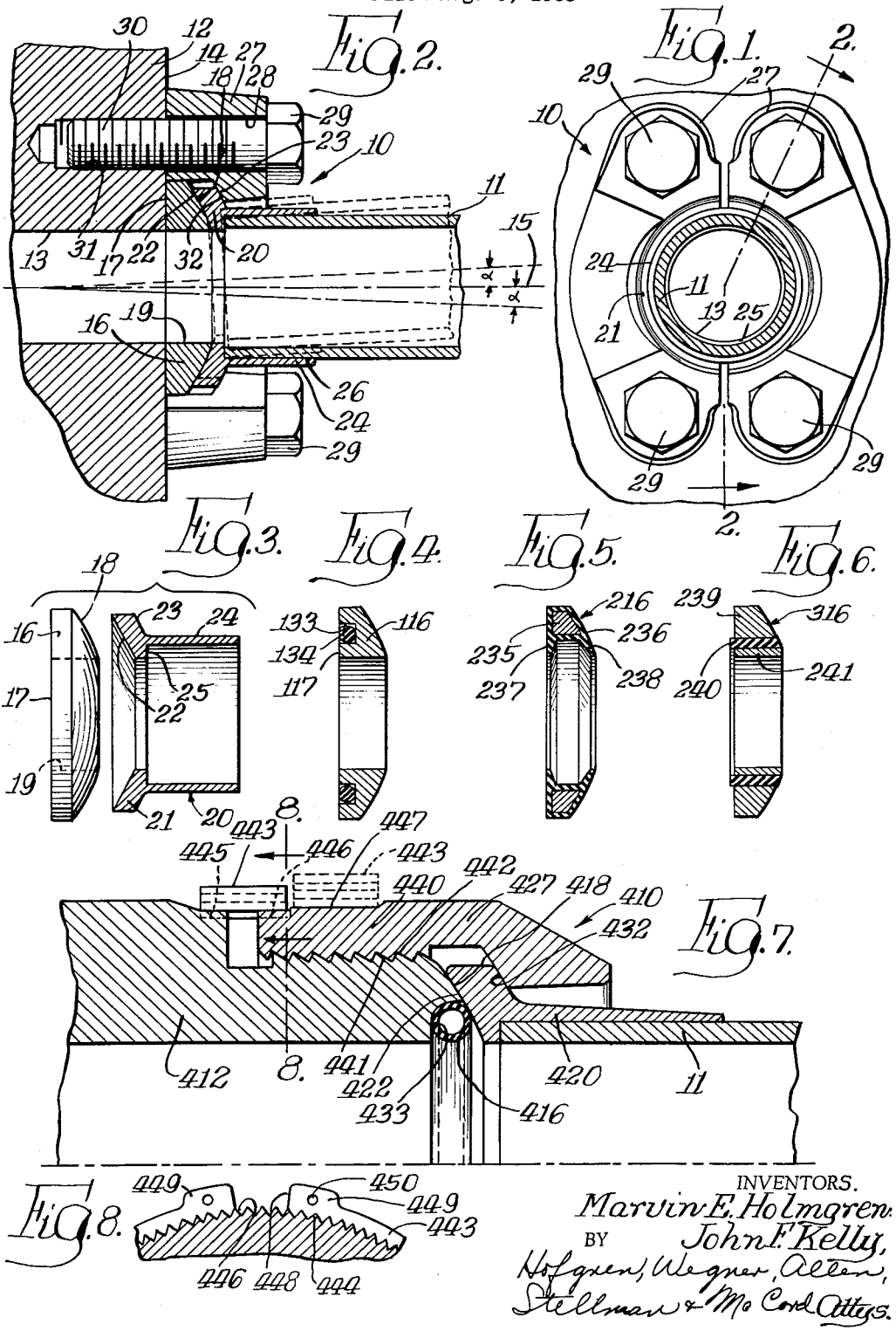

3,233,921
SWIVEL JOINT WITH LOCKING RING
Marvin E. Holmgren, Prospect Heights, and John F. Kelly, Rolling Meadows, Ill., assignors to Imperial-Eastman Corporation, a corporation of Illinois
Filed Aug. 6, 1963, Ser. No. 300,236
2 Claims. (Cl. 285—110)

This invention relates to tube fittings and in particular to swivel joints.

In connecting relatively rigid tubing to apparatus such as apparatus provided with standard S.A.E. four bolt flange bosses, angular disalignment of the tubing axis with the axis of the port in the boss often occurs as a result of inaccurate bends and similar inaccurate tubing arrangements. Thus, very often the tubing to be connected to the boss is axially disaligned with the port by up to approximately four degrees. Such disalignment presents a serious leakage problem particularly at the higher pressures employed in certain of the apparatuses, such as up to 6,000 p.s.i. The present invention comprehends an improved swivel fitting adapted to accommodate such angular disalignment of the tubing relative to the boss port axis while yet assuring a positive sealed connection of the tubing to the boss. Thus, a principal object of the present invention is the provision of a new and improved swivel fitting.

Another object of the invention is the provision of such a swivel fitting having new and improved means for sealingly connecting the tube to the boss outer surface while permitting substantial axial disalignment therebetween.

A further object of the invention is the provision of such a swivel fitting including an improved seal ring of semi-resilient sealing material.

Yet another object of the invention is the provision of such a fitting arranged for use with a boss having a flat surface and a bore opening through that surface, the fitting including an annular seal having an inner flat surface for facially engaging the boss surface circumjacent the bore, and an outer spherical surface, a sleeve having an inner spherical surface facially engaging the spherical surface of the seal, a first outer portion arranged for sealed connection thereto of a tube, and a second outer, radially outer portion having an outer spherical surface, flange means having an inwardly facing spherical shoulder facially engaging the outer spherical surface of the sleeve, and means forcing the flange means toward the boss to cause the flange means inner surface to bear against the sleeve outer spherical surface, resultingly the sleeve inner spherical surface to bear sealingly against the spherical outer surface of the seal, and further resultingly the flat inner surface of the seal to bear sealingly against the flat outer surface of the boss.

Still another feature of the invention is the provision of such a fitting wherein the retaining means is threadably connected to the body member and means are provided selectively engageable with the body member and retaining means for positively precluding relative rotation therebetween.

A yet further feature of the invention is the provision of such a swivel fitting wherein the retainer means includes a groove on an outer portion of the body member and a groove on an inner portion of the retaining means extending parallel to the axis of threading and selectively disposable in longitudinal alignment, and a resilient, segmentally annular locking ring selectively encircling the outer body member portion and the inner retaining means portion and including a rib receivable in each of the grooves.

Still another feature of the invention is the provision of such a swivel fitting wherein the retaining means further includes an annular shoulder outwardly of the inner portion of the retaining means, the locking ring being arranged to be selectively carried on that shoulder with the rib being held out of the body member and retaining means grooves as during make-up of the fitting.

Other features and advantages of the invention will be apparent from the following description taken in connection with the accompanying drawing, wherein:

FIGURE 1 is a front elevation of a swivel fitting embodying the invention as used in connecting a tube to a boss;

FIGURE 2 is a transverse section thereof taken substantially along the line 2—2 of FIGURE 1;

FIGURE 3 is an exploded diametric section of the sleeve and annular seal thereof;

FIGURE 4 is a diametric section of a modified form of seal;

FIGURE 5 is a diametric section of another modified form of seal;

FIGURE 6 is a diametric section of still another modified form of seal;

FIGURE 7 is a fragmentary diametric section of a modified form of swivel fitting embodying the invention; and FIGURE 8 is a transverse section taken substantially along the line 8—8 of FIGURE 7.

In the exemplary embodiment of the invention as disclosed in FIGURES 1–3 of the drawing, a swivel fitting, generally designated 10, is provided for connecting a tube 11 to a boss 12. The tube 11 may be a conventional metallic tube such as for use in carrying fluids under pressure and the boss 12 may comprise a standard S.A.E. four bolt flange boss having a port 13 opening through an outer surface 14 thereof. As shown in FIGURE 2, the outer surface 14 may be planar.

As illustrated in FIGURE 2, the tubing 11 may be disaligned with the axis 15 of the port 13. Illustratively, the angular deviation from the axially aligned position may be up to an angle of approximately four degrees. Fitting 10 is arranged to readily accommodate said disalignment in connecting the tube sealingly to the boss 12.

As best seen in FIGURE 2, the fitting 10 includes an annular seal comprising a ring of a relatively rigid sealing material. Examples of materials suitable for ring 16 are metals such as aluminum, fitted plastic, asbestos, fabric impregnated rubber, and other semi-resilient sealing materials. Sealing ring 16 is provided with a flat inner surface 17 and a segmentally spherical outer surface 18. As shown in FIGURE 2, the bore 19 of the sealing ring is preferably similar in diameter to the bore of boss port 13 to provide a continuous passage therethrough.

The swivel fitting further includes a sleeve 20 which may best be seen in FIGURE 3 to include an inner portion 21 having an inner segmentally spherical surface 22 and an outer segmentally spherical surface 23. Extending axially outwardly from the inner portion 21 is a thin-walled tubular outer portion 24 having an inside diameter substantially equal to the outside diameter of tubing 11. At the inner end of the tubular portion 24, the sleeve is provided with a radial inner shoulder 25 against which the tubing 11 abuts when fully inserted into the sleeve portion 24 as shown in FIGURE 2. The sleeve may be formed of a suitable material such as brass permitting the use of a brazed joint 26 between the tubing and the sleeve in outer portion 24 for sealingly connecting the tube to the sleeve as shown in FIGURE 2.

The swivel fitting 10 still further includes a retainer, herein a split flange 27. Each portion of the flange is provided with a pair of through bores 28 through which is passed a bolt 29 having its threaded shank 30 threadably received in an aligned threaded hole 31 in the boss 12. The flange is further provided with an inwardly facing segmentally spherical surface 32 which confronts the outer surface 23 of the sleeve portion 21, as best seen in FIGURE 2. The flange is preferably formed of a rigid metal capable of retaining the joint in association with the boss against the substantial fluid pressures involved which, as indicated above, may be as high as 6,000 p.s.i.

In assembling the swivel fitting 10, the sleeve is firstly installed on the end of the tubing 11 by brazing the tubing into the sleeve portion 24. The sealing ring 16 is then disposed between the sleeve inner portion 21 and the boss surface 14 circumjacent the bore 13, as shown in FIGURE 2. The split flange 27 is then placed over the sleeve portion 21 with the pressure surface 32 thereof confronting the sleeve surface 23 and the bolts 29 passed through the flange and into engagement with the boss. As the bolts are tightened, the flange surface 32 bears forcibly against the sleeve surface 23 thereby forcing the sleeve inwardly and causing the sleeve inner surface 22 to bear forcibly against the seal outer surface 18. This in turn causes the seal to be forced inwardly to have the seal inner surface 17 bear forcibly against the port outer surface 14. Sufficient force is applied by means of the bolts 29 to cause the sleeve surface 22 to have sealed engagement with the seal surface 18 and the seal surface 17 to have sealed engagement with the boss surface 14. The surfaces 18, 22, 23 and 32 are concentrically spherical permitting the sleeve to be positioned in axial alignment with the tubing 11 notwithstanding an axial disalignment of the tubing 11 with the axis 15 of the boss bore 13. Thus, a positive sealed connection of the tubing 11 is effected in a simple manner notwithstanding the disalignment of the tubing relative to the boss.

Referring now to FIGURE 4, a modified form of sealing ring 116 is shown to comprise a sealing ring, generally similar to sealing ring 16 but having an inwardly opening annular recess 133 in its inner surface 117 adapted to receive a conventional elastomeric O-ring 134 for augmented sealing of the sealing ring to the boss outer surface.

In FIGURE 5, another modified form of sealing ring, generally designated 216, is shown to comprise a rigid annular ring 235 having a completely encapsulating plastic sheath 236 with an inner annular lip 237 and an outer annular lip 238 extending radially inwardly therefrom for augmented sealing engagement with the confronting sleeve and boss surfaces.

In FIGURE 6, still another modified form of sealing ring 316 is shown to comprise a rigid outer ring 239 with a compressible tubular sealing element 240 carried therein and retained in association therewith with a rigid inner retaining ring 241. As shown in FIGURE 6, the tubular sealing element preferably has an axial length slightly greater than the corresponding length of the rings 239 and 241 and thus provides augmented sealing of the sleeve to the boss outer surface. Other than as discussed specifically above, each of the sealing rings 116, 216 and 316 is similar to and functions in a similar manner as sealing ring 16.

Referring now to FIGURE 7, a further modified form of swivel fitting, generally designated 410, is shown to comprise a body member 412, a sleeve 420 and a retainer 427. The sleeve 420 is generally similar to sleeve 20 of fitting 10 and is similarly brazed to the end of the tubing 11. In lieu of the sealing ring 16, however, the body member 412 is itself provided with a segmentally spherical outer surface 418 arranged to be engaged by the inner segmentally spherical surface 422 of the sleeve 420. A sealing ring, generally designated 416, is provided in a radially inwardly and axially outwardly opening recess 433 in the outer end of the body member 412 for sealing the sleeve to the body member as a result of fluid pressure acting radially outwardly thereagainst. In the embodiment of FIGURE 7, a hollow annular sealing ring 416 is illustrated. It should be understood that any other suitable form of yieldable sealing ring may be employed within the scope of the invention.

In fitting 410, the retainer is provided with an inner portion 440 having internal threads 441 for threaded engagement with external threads 442 on the body member 412 for forcibly advancing the inner pressure surface 432 of the retainer against the sleeve 420. To lock the retainer 427 in the innermost position, a locking ring 443 is provided. The locking ring is provided with a plurality of inner ribs in the form of serrations 444 which are complementary to and are selectively received in corresponding grooves defined by serrations 445 on the body member 412 and serrations 446 on the retainer 427 when the serrations are axially aligned. During the threading of the retainer 427 on the threads 441 of the body member 412, the locking ring 443 is retained on an annular shoulder 447 outwardly of the serrated portion 446, the diameter of the surface 447 being greater than the diameter of the serrated portion 446. When the retainer 427 is threadably adjusted to the final position shown in FIGURE 7, the user then merely moves the locking ring 443 from the right hand dotted position shown in FIGURE 7 to the left hand full line position thereof wherein the serrations 444 of the ring engage the serrations 445 of the body member and serrations 446 of the retainer to positively lock the retainer against rotation relative to the body member. To facilitate axial movement of the locking ring from the locking position to the outer dotted position of FIGURE 7 as during disassembly of the fitting, the locking ring is split at 448 and provided with a pair of enlarged ends 449. Thus, by suitably grasping the enlarged ends 449, the locking ring may be radially enlarged to permit movement on to the shoulder 447. To preclude inadvertent enlargement of the ring during the locking functioning, the ends 449 may be provided with opening 450 therein. A wire may be passed through the holes 450 and twisted together to retain the ring 443 firmly against the serrations of the body member and retainer.

In assembling fitting 410, the used firstly slides the retainer on to the end of the tubing 11 and then brazes the tubing 11 into the sleeve 420 as in fitting 10. The sealing ring 416 is then installed in the recess 433. The user then moves the retainer inwardly to engage the threads 441 thereof with the body member threads 442 and threadably advances the retainer to the position of FIGURE 7. During the assembly, the locking ring 443 is retained on the shoulder 447 permitting free rotation between the retainer and body member. When the retainer is fully advanced and the fitting is in the made-up arrangement as shown in FIGURE 7, the user merely slides the locking ring from the shoulder 447 on to the serrations 446 and 445 to lock the retainer against further rotation relative to the body member. To secure the locking ring, the user may then, as indicated above, wire the two end portions 449 together.

Thus, the fittings of the present invention are extremely simple and economical in construction while providing improved sealed connection of the tubing notwithstanding an axial angular disalignment of the tubing relative to the element to which it is to be connected. The fittings are easily assembled and disassembled, while yet in the made-up condition, provide a positive sealed connection of the tubing.

While we have shown and described certain embodiments of our invention, it is to be understood that it is capable of many modifications. Changes, therefore, in the construction and arrangement may be made without departing from the spirit and scope of the invention as defined in the appended claims.

We claim:

1. For use with a boss having a flat surface and a bore opening through said surface, a swivel fitting comprising:

an annular seal including first metal ring means having an inner planar surface for disposition adjacent said boss surface circumjacent said bore, an outer spherical surface, and annular elastomeric sealing means engaging said ring means and projecting inwardly beyond said inner planar surface and outwardly from said outer spherical surface; a sleeve having an inner spherical surface facially engaging said spherical surface of the seal, a first outer portion arranged for sealed connection thereto of a tube, and a second outer, radially outer portion having an outer spherical surface; flange means having an inwardly facing spherical shoulder facially engaging said outer spherical surface of the sleeve; and means for forcing the flange means towards the boss to cause said flange inner surface to bear against said sleeve outer spherical surface, said sleeve inner spherical surface to exert force against said spherical outer surface of the seal, and said flat inner surface of the seal to exert force against the flat outer surface of the boss, with said elastomeric sealing means sealingly compressed against said boss surface and said sleeve inner surface, said annular seal comprising second metal ring means having an inner planar surface for disposition adjacent said boss surface circumjacent said bore, said first and second metal ring means being arranged coaxially one within the other with the inner planar surfaces of both of said metal ring means being disposed in the same plane to abut said boss, and said annular elastomeric sealing means being disposed and retained between said metal ring means.

2. For use with a boss having a flat surface and a bore opening through said surface, a swivel fitting comprising: an annular seal including an inner metal ring and annular elastomeric sealing means encapsulating said ring and having an inner planar surface for disposition adjacent said boss surface circumjacent said bore and an outer spherical surface; a sleeve having an inner spherical surface facially engaging said spherical surface of the seal, a first outer portion arranged for sealed connection thereto of a tube, and a second outer, radially outer portion having an outer spherical surface; flange means having an inwardly facing spherical shoulder facially engaging said outer spherical surface of the sleeve; and means for forcing the flange means towards the boss to cause said flange inner surface to bear against said sleeve outer spherical surface, said sleeve inner spherical surface to exert force against said spherical outer surface of the seal, and said flat inner surface of the seal to exert force against the flat outer surface of the boss, with said elastomeric sealing means sealingly compressed against said boss surface and said sleeve inner surface, and said elastomeric sealing means including radially inwardly extending lip seal means.

References Cited by the Examiner

UNITED STATES PATENTS

| 502,038 | 7/1893 | Herman | 285—266 |
|---|---|---|---|
| 605,098 | 6/1898 | Hammer | 285—167 |
| 1,846,096 | 2/1932 | Feldmeir | 285—334.4 |
| 1,915,100 | 6/1933 | McLaughlin | 285—267 |
| 2,422,597 | 6/1947 | Stewart | 285—261 |
| 2,462,023 | 2/1949 | Johanson. | |

FOREIGN PATENTS

| 606,370 | 6/1926 | France. |
|---|---|---|
| 991,025 | 9/1951 | France. |
| 1,212,946 | 3/1960 | France. |
| 14,227 | 1885 | Great Britain. |
| 384,716 | 12/1932 | Great Brtiain. |
| 777,749 | 6/1957 | Great Britain. |

CARL W. TOMLIN, *Primary Examiner.*